United States Patent
Schoor

(10) Patent No.: US 9,872,511 B2
(45) Date of Patent: Jan. 23, 2018

(54) CRUSTACEAN BAIT WITH SELECTABLE LONGEVITY

(71) Applicant: Ace of Baits Co. Inc., Ladysmith (CA)

(72) Inventor: Ryan Wilfred Schoor, Ladysmith (CA)

(*) Notice: Subject to any disclaimer, the term of this patent is extended or adjusted under 35 U.S.C. 154(b) by 482 days.

(21) Appl. No.: 13/666,837

(22) Filed: Nov. 1, 2012

(65) Prior Publication Data
US 2013/0118055 A1     May 16, 2013

Related U.S. Application Data

(60) Provisional application No. 61/554,422, filed on Nov. 1, 2011.

(51) Int. Cl.
*A01K 97/04* (2006.01)
*A23K 1/18* (2006.01)
*A01K 79/00* (2006.01)
*A23K 40/20* (2016.01)
*A23K 10/26* (2016.01)
*A23K 20/147* (2016.01)
*A23K 20/158* (2016.01)
*A23K 20/163* (2016.01)
*A23K 50/00* (2016.01)
*A23K 50/80* (2016.01)

(52) U.S. Cl.
CPC .............. *A23K 1/188* (2013.01); *A01K 79/00* (2013.01); *A01K 97/045* (2013.01); *A23K 10/26* (2016.05); *A23K 20/147* (2016.05); *A23K 20/158* (2016.05); *A23K 20/163* (2016.05); *A23K 40/20* (2016.05); *A23K 50/00* (2016.05); *A23K 50/80* (2016.05)

(58) Field of Classification Search
CPC . A23K 1/00; A23K 1/18; A23K 1/188; A23K 40/00; A23K 40/25; A23K 50/80; A23K 40/20; A23K 10/26; A23K 20/158; A01K 79/00; A01K 85/00; A01K 85/01; A01K 85/005
USPC ........... 426/1, 512, 515, 573, 576, 601, 805; 43/42, 42.06, 100; 119/204, 51.04
See application file for complete search history.

(56) References Cited

U.S. PATENT DOCUMENTS

| | | | | |
|---|---|---|---|---|
| 3,410,689 | A * | 11/1968 | Gerd .................... | A01K 97/045 426/1 |
| 4,245,420 | A * | 1/1981 | Carr ..................... | A01K 97/045 239/34 |
| 2006/0008445 | A1* | 1/2006 | Garralda ............... | A01K 85/00 424/84 |
| 2008/0292771 | A1* | 11/2008 | Jackman ............... | A22C 17/00 426/589 |
| 2009/0069540 | A1* | 3/2009 | Yunoki .................. | A61L 27/24 530/356 |

FOREIGN PATENT DOCUMENTS

JP        3043235 B2 * 5/2000
NO   WO 2008148873 A2 * 12/2008 .......... A61K 31/401

* cited by examiner

*Primary Examiner* — Walter Moore
(74) *Attorney, Agent, or Firm* — Island IP Law; Stephen R. Burri

(57) ABSTRACT

A bait cake for a crustacean trap, the bait cake comprising a mixture of animal collagen, water, gelatin, gelling agents, fish meal, and fish oil, molded and cured into a cylindrical cake; a method of preparation of a bait cake which preserves the attractiveness of the bait cake to crustaceans, and a method of attracting crustaceans to a trap using the bait cake of the invention.

16 Claims, 1 Drawing Sheet

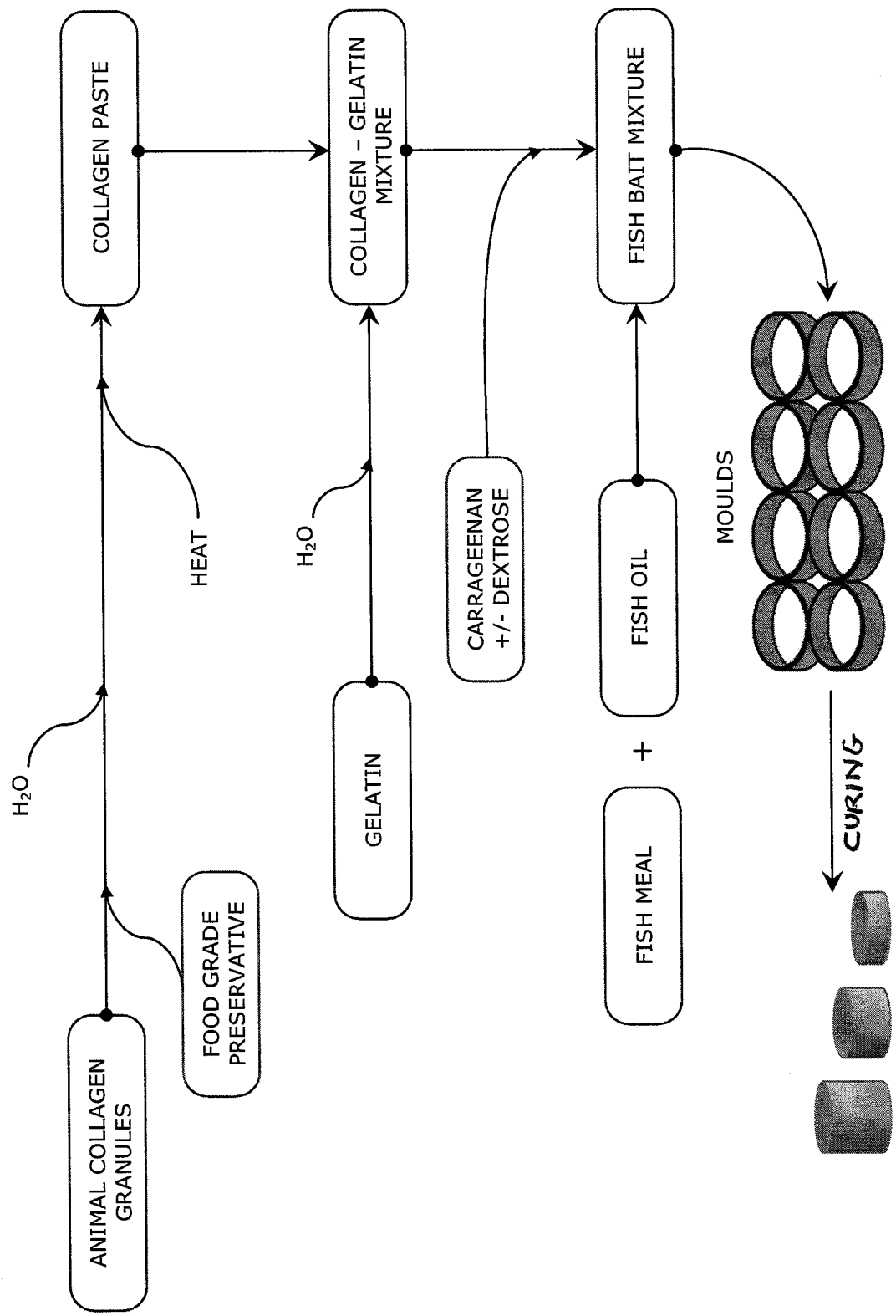

CRUSTACEAN BAIT WITH SELECTABLE LONGEVITY

FIELD OF THE INVENTION

The present invention relates to fishing. In particular, the present invention relates to baits for crustacean fishing.

BACKGROUND OF THE INVENTION

Historically, raw or frozen fish of various species has been the preferred bait for lobster and crab fishing. Such raw or frozen fish bait is expensive and makes inefficient use of raw materials. In addition, such prior art baits have a detrimental impact on the land and marine environments. To obtain such prior art bait, the fish once caught must be frozen to preserve the bait characteristics. This freezing process requires large amounts of fuel and electrical power. The frozen fish requires cold storage, transport by refrigerated trucks, and freezers on board the boats, all of which consume more fuel. Inevitably, there will be spoilage of the frozen bait, as the raw fish is easily contaminated.

Another negative aspect of using raw fish as bait is the resulting depletion of fish stocks used for bait. In the absence of raw fish bait, some are contemplating the use of chemical products as bait. The present invention is intended to provide a natural source of bait which avoids the use of artificial alternatives and preserves the environment.

One alternate to raw fish bait has been pellet bait produced from fish byproducts. Although pellet bait is 100% natural and has demonstrated successful use in the prawn fisheries, the pellet form has not been consistently successful for lobster and crab fisheries when used in the deep colder water areas such as those found on the Atlantic and Pacific coasts of Canada and the United States of America. This likely is due to the way the pellets are manufactured, as well as the binding properties of a pellet. The pellets are made under high heat and high pressure, which essentially cooks the product, resulting in a less desirable attractant value for lobster and crab when used in these lower temperature waters.

In contrast, the bait product of the present invention uses natural ingredients and the manufacturing process does not involve high heat or high pressures, thereby retaining maximum attractant properties in the bait with the highest concentration of fish content possible.

SUMMARY OF THE INVENTION

There is provided a method of preparing a crustacean bait cake, comprising the steps of: in a first container, stirring between 100 g and 750 g of animal collagen granules into 237 ml of water at or below room temperature, and letting the mixture sit until the granules have absorbed all of the water; heating the gelatinous collagen granules at a temperature of between 43 and 60 degrees Celsius until the granules are fully dissolved into a collagen paste; in a second container, rapidly stirring between 5.7 g and 227 g of gelatin into between 60 ml and 600 ml water having a temperature of between 18 and 22 degrees Celsius until the gelatin has absorbed all of the water; mixing the gelatin with the collagen paste to form a collagen gelatin mixture; in a third container, completely kneading between 118 ml and 591 ml of fish oil into between 284 g and 1.14 kg of fish meal to form a fish paste; mixing the collagen gelatin mixture with the fish paste to produce a fish bait mixture; moulding the fish bait mixture into desired shapes and cooling for at least 30 minutes to form fish bait cakes; and curing the fish bait cakes for between 2.5 and 16 hours at or below 22 degrees Celsius.

0.15 g and 15 g of a food preservative selected from the group of food preservatives comprising sodium benzoate and potassium sorbate may be dissolved in the water.

The heating temperature in step (b) may be maintained at 55 degrees Celsius. The water in step (c) may be heated to at least 27 degrees Celsius, or to at least 43 degrees Celsius.

30 mL of aqueous solution containing between 2.8 g and 33 g of a gelling agent selected from the group of gelling agents comprising carrageenan and a carrageenan/dextrose blend may be added to the collagen gelatin mixture.

The amount of animal collagen may be 129 g, and may have a Bloom strength of between 100 g and 750 g.

The amount of fish meal may be 737 g, and the amount of fish oil may be 266 ml.

The amount of gelatin may be 39.7 g. The amount of water added to the gelatin may be 73.9 ml.

The bait may be shaped into a cake shape having a circumference of 3 inches and a height of between 1.5 inches and 3 inches.

The amount of food preservative may be between 1 g and 2 g. The amount of gelling agent may be 14 g.

There is also provided a bait product produced by the foregoing method. There is provided a method of attracting crustaceans to a trap comprising the steps of placing the product produced by the foregoing method in a crustacean trap and setting the trap in water suitable for trapping crustaceans.

There is further provided a bait cake for a crustacean trap, the bait cake comprising a mixture of animal collagen, water, gelatin, fish meal, and fish oil, dried into a cylindrical cake. The bait cake may be of a size and shape selected to determine the durability of the bait cake during marine crustacean trapping.

BRIEF DESCRIPTION OF THE DRAWING

A detailed description of the preferred embodiments is provided below by way of example only and with reference to the following drawing, in which FIG. 1 is a schematic of a preferred embodiment of the method of preparing a crustacean bait cake of the present invention.

In the drawing, one embodiment of the invention is illustrated by way of example. It is to be expressly understood that the description and drawing are only for the purpose of illustration and as an aid to understanding, and are not intended as a definition of the limits of the invention.

DETAILED DESCRIPTION OF THE INVENTION

There is provided a bait product for commercial and recreational lobster and crab fishing. The bait may be pressed into moulds of various shapes, including pucks or cylinders, and referred to herein as "cakes". The cakes may be placed into bait jars or mesh bait bags which may then be placed into the fishing traps. Each cake is comprised of a blend of fish meal and fish oil which is held together with natural animal source collagen and gelatins. The bait cakes are designed to break down over a desired number of days while consistently releasing an attractant to draw lobsters and crab to the bait, which is designed to mimic the attractant value of raw baits currently in use in the industry.

The fish meal and fish oil are obtained by rendering raw fish to produce source ingredients which are completely natural. As such, the bait cakes produced from these materials retain the attractant value of fresh or frozen raw fish bait with the added benefit of providing an even greater attractant value due to the high concentration of these rendered materials.

The collagen and gelatins used for binding also are completely natural and are safe for the environment. The carrageenan is derived from seaweed and the dextrose is a sugar base which allows the carrageenan to be workable. This provides a binding characteristic that allows a prolonged natural breakdown of the cake and aids in allowing the gelatin to break apart at a more consistent level allowing the attractant of the cake to perform properly.

Food grade additives such as sodium benzoate or potassium sorbate may be added to control bacterial growth and for mold prevention in order to increase shelf life of the bait cakes. The bait cakes of the present invention provide a high quality attractant bait without causing harm to the environment.

According to the preferred embodiment of the invention, as depicted in FIG. 1, the bait cakes may be manufactured according to the following procedural steps:

Step 1: Stir 129 g of animal collagen granules into 237 ml of water at or below room temperature, and let the mixture sit for at least 20 minutes until the granules are gelatinous to the touch and have absorbed all of the water.

Step 2: Heat the gelatinous collagen granules slowly at a temperature range of 43 to no more than 60 degrees Celsius to fully dissolve the granules to form a collagen paste with the consistency of liquid honey. Preferably, a lid may be placed on the container when heating to avoid evaporation. This will prevent a decrease in viscosity which would make the liquid thicker and less workable for the final mixing of materials.

Preferably, the heating will be carried out at a temperature of between 43 and 60 degrees Celsius, and ideally, the heating temperature for this step will be 55 degrees Celsius. Heating may be accomplished by heating water in a pot and monitoring the water temperature, then placing the gelatinous collagen granules in a glass jar which is placed over the heated water of the pot in a manner which ensures the collagen paste is completely dissolved. Temperature monitoring may also be achieved with a thermometer. In machine production, the temperature of the container may be precisely set to the desired temperatures.

Step 3: In a preferred embodiment, in a separate container dissolve 39.7 g gelatin in 73.9 ml water at room temperature of between 18 and 22 degrees Celsius by adding the gelatin to the water while rapidly stirring then allowing the mixture to sit for approximately 5 minutes until the gelatin has absorbed all of the water, known as blooming. In an alternate embodiment, the water may be heated to at least 43 degrees Celsius. In another alternate embodiment, cooler water at a temperature as low as 27 degrees Celsius may be used, but increased stirring may be necessary to avoid congealing.

Step 4. Thoroughly mix the dissolved gelatin from Step 3 into the collagen paste of step 2 to form a collagen gelatin mixture. The collagen paste may instead be added to the dissolved gelatin.

Step 5: In a separate container, knead together 737 g of fish meal with 266 ml of fish oil until the fish oil is completely absorbed into the fish meal to form a fish paste having no visibly dry portions.

Step 6: Add the collagen gelatin mixture of step 4 to the fish paste of Step 5 and mix thoroughly to produce a fish bait mixture. Alternatively, the fish paste may be added to the collagen gelatin mixture.

Step 7: Press the fish bait mixture of Step 6 into moulds of desired shape and allow to cool for at least 30 minutes and preferably at least 45 minutes until outer surface is set. Remove partially set fish cakes from moulds, place on vented racking with sufficient bottom venting to cure, allowing air to reach the bottom surface of the cakes, and let sit for at least 2.5 hours at or preferably below room temperature until set. Cakes should not be permitted to dry more than 16 hours to avoid excessive drying. During curing, air may be circulated past the curing cakes to increase the rate of curing. An increase in the rate of curing increases the degree to which the attractant fish oils are sealed into the cakes.

In an alternate embodiment of the present invention having an extended shelf life, in Step 1, prior to adding the water to the collagen granules, 1 to 2 grams of sodium benzoate or potassium sorbate may be dissolved in the water at or below room temperature.

In a further embodiment of the present invention, 14 g of carrageenan or a carrageenan/dextrose blend dissolved in 30 ml water at room temperature or below may be added to the collagen gelatin mixture of step 4 prior to mixing with the fish paste.

In alternate embodiments of the present invention, different amounts of various ingredients may be used. The amount of collagen may range from 100 g to 750 g. The amount of sodium benzoate may range from 0.5 g to 15 g. The amount of fish meal may range from 284 g to 1.14 kg. The volume of fish oil may range from 118 ml to 591 ml.

The amount of carrageenan or carrageenan/dextrose blend may range from 2.8 g to 33 g. The amount of gelatin may range from 5.7 g to 227 g. The volume of water may range from 60 ml to 600 ml. In a preferred embodiment, the collagen granules will have Bloom strength of between 100 g and 750 g.

The ingredient amounts described herein are sufficient to produce approximately 8 small cakes that fish for 1-7 days, or 6 medium cakes that fish for 1-10 days, or 4 large cakes that fish for 1-14 days. Ingredients may be altered proportionately to produce larger or smaller batches.

The dimensions of the fish cake may be selected to determine the useful durability or longevity measured in 'fishing days'. The longevity of the bait cakes was determined using sea trials in which bait cakes of differing sizes were placed in crustacean traps underwater in fishing areas. Traps were checked regularly to determine the degree of degradation of the bait cakes over a period of 14 days. "Fishing days" are a measure of bait longevity. For example, a bait cake having a 5 'fishing day' longevity will maintain its integrity and release attractant for 5 days under water in fishing conditions.

Experimental results show that a small cake having a 3 inch circumference and 1.5 inch height will provide 1-7 fishing days. Experimental results show that in a preferred embodiment in which the bait cake is used in a bait jar, this small puck will provide 5-7 fishing days. A medium cake having a 3 inch circumference and 2 inch height will provide 1-10 fishing days. In a preferred embodiment in which the bait cake is used in a bait jar, this medium cake will provide 5-10 fishing days. A large cake having a 3 inch circumference and 3 inch height will provide 1-14 fishing days. In a preferred embodiment in which the bait cake is used in a one liter bait jar, this large cake will provide 10-14 fishing days. Other dimensions are also possible, and bait cake duration will vary depending on environmental factors such as fishing depth, water temperature, current strength, quantity of sea lice, and others.

The method of production of the fishing bait cakes of the present invention preserves the attractant value of the fish oil, increasing the longevity of the bait bakes during fishing.

The bait product of the present invention provides several advantages over the prior art. It is sourced from 100% natural ingredients. It is not polluting to the environment.

No freezers or refrigerators are required for storage or transport of the bait, reducing energy use. The bait cakes have a longer shelf life than prior art natural bait products, reducing spoilage and waste. The bait cakes of the present invention are very easy to handle and use, reducing fishing costs.

The bait cakes have low water content, reducing their weight. The bait cakes provide consistent concentrated attractant properties over their period of use, thereby preventing unnecessary risks involved in re-baiting during bad weather. Prolonged consistent fishability of the baits of the present invention may permit catch removal without the requirement for rebaiting, as well as delayed trap checking when necessary.

From the foregoing, it will be seen that this invention is one well adapted to attain all of the ends and objectives herein set forth, together with other advantages which are obvious and which are inherent to the apparatus. It will be understood that certain features and sub-combinations are of utility and may be employed with reference to other features and sub-combinations. This is contemplated by and is within the scope of the claims. As many possible embodiments may be made of the invention without departing from the scope of the claims. It is to be understood that all matter herein set forth or shown in the accompanying drawings is to be interpreted as illustrative and not in a limiting sense. It will be appreciated by those skilled in the art that other variations of the preferred embodiment may also be practised without departing from the scope of the invention.

The invention claimed is:

1. A method of preparing a crustacean bait cake, comprising the steps of:
   a. in a first container, stirring between 100 g and 750 g of animal collagen granules into a first aliquot of between 60 ml and 600 ml of water at or below room temperature, and letting the mixture sit until the granules have absorbed all of the water;
   b. heating the collagen granules at a temperature of between 43 and 60 degrees Celsius until the granules are fully dissolved into a collagen paste;
   c. in a second container, stirring between 5.7 g and 227 g of gelatin into a second aliquot of between 60 ml and 600 ml of water having a temperature of between 18 and 22 degrees Celsius until the gelatin has absorbed all of the water;
   d. fully dissolving the gelatin into the collagen paste to form a collagen gelatin mixture;
   e. in a third container, completely kneading between 118 ml and 591 ml of fish oil into between 284 g and 1.14 kg of fish meal to form a fish paste;
   f. mixing the collagen gelatin mixture with the fish paste to produce a bait mixture;
   g. molding the bait mixture into a cylindrical shape;
   h. cooling the bait mixture for at least 30 minutes to form crustacean bait cakes; and
   i. curing the bait cakes for between 2.5 and 16 hours at or below 22 degrees Celsius.

2. The method of claim 1, further comprising the additional step prior to step (a), of dissolving in the first aliquot of water between 0.15 g and 15 g of a food preservative selected from the group of food preservatives comprising sodium benzoate and potassium sorbate.

3. The method of claim 2, wherein the amount of food preservative is between 1 g and 2 g.

4. The method of claim 1, wherein the heating temperature in step (b) is maintained at 55 degrees Celsius.

5. The method of claim 1, wherein prior to step (e), 30 mL of aqueous solution containing between 2.8 g and 33 g of a gelling agent is added to the collagen gelatin mixture, wherein the gelling agent is selected from the group consisting of carrageenan and a blend of carrageenan and dextrose.

6. The method of claim 5, wherein the amount of gelling agent is 14 g.

7. The method of claim 1, wherein the amount of animal collagen is reduced to 129 g and the first aliquot of water is 237 ml.

8. The method of claim 1, wherein the animal collagen granules have a Bloom strength of between 100 g and 750 g.

9. The method of claim 1, wherein the amount of fish meal is 737 g and the amount of fish oil is 266 ml.

10. The method of claim 1, wherein the amount of gelatin in step (c) is 39.7 g and the amount of water in step (c) is 73.9 ml.

11. The method of claim 1, wherein the molding in step (g) is performed in a container warmed to between 20 and 60 degrees Celsius.

12. The method of claim 1, wherein the bait cakes in step (h) have a circumference of 3 inches.

13. The method of claim 12, wherein the bait cakes have a height of 1.5 inches.

14. The method of claim 12, wherein the bait cakes have a height of 2 inches.

15. The method of claim 12, wherein the bait cakes have a height of 3 inches.

16. A method of preparing a crustacean bait cake, comprising the steps of:
   a. in a first container, stirring 129 g of animal collagen granules into 237 ml of water at or below room temperature, and letting the mixture sit until the granules have absorbed all of the water;
   b. heating the collagen granules at a temperature of 55 degrees Celsius until the granules are fully dissolved into a collagen paste;
   c. in a second container, stirring between 39.7 g of gelatin into between 73.9 ml water having a temperature of between 18 and 22 degrees Celsius until the gelatin has absorbed all of the water;
   d. fully dissolving the gelatin into the collagen paste to form a collagen gelatin mixture;
   e. in a third container, completely kneading 266 ml of fish oil into 737 g of fish meal to form a fish paste;
   f. mixing the collagen gelatin mixture with the fish paste to produce a bait mixture;
   g. molding the bait mixture into a cylindrical shape;
   h. cooling the bait mixture for at least 30 minutes to form crustacean bait cakes; and
   i. curing the bait cakes for between 2.5 and 16 hours at or below 22 degrees Celsius.

* * * * *